(12) United States Patent
Romanski

(10) Patent No.: US 7,374,640 B2
(45) Date of Patent: May 20, 2008

(54) GROOVED SURFACE BELT OR ROLL AND METHOD OF FABRICATION

(75) Inventor: Eric Romanski, Clifton Park, NY (US)

(73) Assignee: Albany International Corp., Albany, NY (US)

( * ) Notice: Subject to any disclaimer, the term of this patent is extended or adjusted under 35 U.S.C. 154(b) by 685 days.

(21) Appl. No.: 10/444,416

(22) Filed: May 23, 2003

(65) Prior Publication Data

US 2004/0234694 A1    Nov. 25, 2004

(51) Int. Cl.
  *D21F 7/00*    (2006.01)
(52) U.S. Cl. ............... 162/358.4; 162/901; 492/48; 427/389.9; 427/412; 427/288; 364/257; 364/259
(58) Field of Classification Search ........ 162/205–207, 162/306, 348, 358.1, 358.2, 358.3, 358.4, 162/360, 361, 900–903; 428/292.1, 293.7, 428/295.4, 300.7, 301.4, 909; 156/166–181, 156/184–195; 264/257, 259, 265; 427/389.9, 427/412, 172, 176, 285, 288; 492/48
See application file for complete search history.

(56) References Cited

U.S. PATENT DOCUMENTS

| | | | | |
|---|---|---|---|---|
| 3,718,959 A | * | 3/1973 | Sailas | ............... 492/33 |
| 4,111,634 A | * | 9/1978 | Limbach et al. | ......... 425/505 |
| 4,176,270 A | * | 11/1979 | Sailas | ............ 219/121.14 |
| 4,552,620 A | * | 11/1985 | Adams | ............. 162/358.4 |
| 4,643,916 A | | 2/1987 | Kiuchi | |
| 4,897,026 A | | 1/1990 | Yokoya | |
| 4,978,428 A | | 12/1990 | Cronin et al. | |
| 5,171,389 A | * | 12/1992 | Stigberg | ............. 156/165 |
| 5,208,087 A | | 5/1993 | Stigberg | |
| 5,238,537 A | | 8/1993 | Dutt | |
| 6,428,874 B1 | | 8/2002 | McGahern et al. | |
| 6,500,308 B1 | * | 12/2002 | Lehtonen et al. | ........ 162/358.4 |
| 6,733,833 B2 | * | 5/2004 | Ampulski | ........... 427/286 |
| 2004/0234716 A1 | * | 11/2004 | Madden et al. | ........... 428/37 |

FOREIGN PATENT DOCUMENTS

| | | |
|---|---|---|
| CA | 2 068 800 | 11/1992 |
| DE | 38 27 486 A | 2/1990 |
| DE | 38 27 486 A1 | 2/1990 |
| DE | 41 15 816 A | 11/1991 |
| DE | 41 15 816 A1 | 11/1992 |
| EP | 0 922 806 A | 6/1999 |
| EP | 1 081 275 A | 3/2001 |

* cited by examiner

*Primary Examiner*—Eric Hug
(74) *Attorney, Agent, or Firm*—Frommer Lawrence & Haug LLP; Ronald R. Santucci

(57) ABSTRACT

The present invention is a grooved belt, or surface roll where applicable, and a method for making these belts or rolls, comprising placing a chemically reactive material on a partially completed belt surface, and depositing an elastomeric material onto the chemically reactive material which reacts and forms a bond therewith to create a pattern. Placement of the elastomeric material is used to create the grooves, for example. The grooves are formed without machining and the resulting belt surface is smooth and uniform without cuts or cracks.

44 Claims, 2 Drawing Sheets

GROOVED SURFACE BELT OR ROLL AND METHOD OF FABRICATION

FIELD OF THE INVENTION

The present invention is directed to the field of papermaking, particularly to a method of making a grooved belt, or roll cover where applicable, used in papermaking machines and processes. The invention concerns using ribbon placement to create the grooves without machining the belt surface.

BACKGROUND OF THE INVENTION

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Rising energy costs have made it increasingly desirable to remove as much water as possible from the web prior to its entry into the dryer section. As the dryer drums are typically heated from within by steam, costs associated with steam production may be substantial, especially when a large amount of water must be removed from the web.

Traditionally, press sections have included a series of nips formed by pairs of adjacent cylindrical press rolls. In recent years, the use of long press nips of the shoe type has been found to be more advantageous than the use of nips formed by pairs of adjacent press rolls. This is because the longer the time a web can be subjected to pressure in the nip, the more water can be removed there, and, consequently, the less water will remain behind in the web for removal through evaporation in the dryer section.

The present invention relates, in part, to long nip presses of the shoe type. In this variety of long nip press, the nip is formed between a cylindrical press roll and an arcuate pressure shoe. The latter has a cylindrically concave surface having a radius of curvature close to that of the cylindrical press roll. When the roll and shoe are brought into close physical proximity to one another, a nip, which can be five to ten times longer in the machine direction than one formed between two press rolls, is formed. Since the long nip may be five to ten times longer than that in a conventional two-roll press, the so-called dwell time, during which the fibrous web is under pressure in the long nip, may be correspondingly longer than it would be in a two-roll press. The result is a dramatic increase in the dewatering of the fibrous web in the long nip relative to that obtained using conventional nips on paper machines.

A long nip press of the shoe type requires a special belt, such as that shown in U.S. Pat. No. 5,238,537 to Dutt (Albany International Corp.), the teachings of which are incorporated herein by reference. The belt is designed to protect the press fabric, which supports, carries and dewaters the fibrous web, from the accelerated wear that would result from direct, sliding contact over the stationary pressure shoe. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

Belts of the variety shown in U.S. Pat. No. 5,238,537 are made by impregnating a woven base fabric, which takes the form of an endless loop, with a synthetic polymeric resin. Preferably, the resin forms a coating of some predetermined thickness on at least the inner surface of the belt, so that the yarns from which the base fabric is woven may be protected from direct contact with the arcuate pressure shoe component of the long nip press. It is specifically this coating which must have a smooth, impervious surface to slide readily over the lubricated shoe and to prevent any of the lubricating oil from penetrating the structure of the belt to contaminate the press fabric, or fabrics, and fibrous web.

The base fabric of the belt shown in U.S. Pat. No. 5,238,537 may be woven from monofilament yarns in a single or multi-layer weave, and is woven so as to be sufficiently open to allow the impregnating material to totally impregnate the weave. This eliminates the possibility of any voids forming in the final belt. Such voids may allow the lubrication used between the belt and shoe to pass through the belt and contaminate the press fabric or fabrics and fibrous web. The base fabric may be flat-woven, and subsequently seamed into endless form, or woven endless in tubular form.

When the impregnating material is cured to a solid condition, it is primarily bound to the base fabric by a mechanical interlock, wherein the cured impregnating material surrounds the yarns of the base fabric. In addition, there may be some chemical bonding or adhesion between the cured impregnating material and the material of the yarns of the base fabric.

Long nip press belts, such as that shown in U.S. Pat. No. 5,238,537, depending on the size requirements of the long nip presses on which they are installed, have lengths from roughly 10 to 35 feet (approximately 3 to 11 meters), measured longitudinally around their endless-loop forms, and widths from roughly 6 to 35 feet (approximately 2 to 11 meters), measured transversely across those forms. The manufacture of such belts is complicated by the requirement that the base fabric be endless prior to its impregnation with a synthetic polymeric resin.

It is often desirable to provide the belt with a resin coating of some predetermined thickness on its outer surface as well as on its inner surface. By coating both sides of the belt, its woven base fabric will be closer to, if not coincident with, the neutral axis of bending of the belt. In such a circumstance, internal stresses which arise when the belt is flexed on passing around a roll or the like on the paper machine will be less likely to cause the coating to delaminate from either side of the belt.

Moreover, when the outer surface of the belt has a resin coating of some predetermined thickness, it permits grooves, blind-drilled holes or other cavities to be formed on that surface without exposing any part of the woven base fabric. These features provide for the temporary storage of water pressed from the web in the press nip, and are usually produced by grooving or drilling in a separate manufacturing step following the curing of the resin coating.

The present invention relates particularly to a grooved press belt which could be used in a long nip press or also in a conventional press. In addition, the present invention relates to a grooved roll cover.

In the case of conventionally grooved belts, a machining process is typically used to create the surface grooves. The grooves define channels and are separated from one another by what may be referred to as land areas. The width and depth of the grooves and the number of grooves per inch dictate the void volume of the grooved belt surface. In addition, the need for the belt to flex dictates certain material characteristics. For instance, the material must be sufficiently flexible to conform to the belt path and still be rigid enough so as not to collapse under press loads. In this regard, it is noted that elastomers such as urethane have been successfully used heretofore.

Roll covers are manufactured in a variety of ways, using varied materials such as rubber, rubber-like materials, polymers or metal alloys. Current methods of manufacturing roll covers include "laying up" sections of uncured mats of polymeric compounds onto a roll body, sometimes with textile reinforcement. This forms a roll cover of several sections, which is finished by heat curing to form a continuous cover. This cover is ground and may undergo other surface finishing steps. Finally, grooves are cut in a circumferential pattern in the surface to assist sheet dewatering in the press nip. Another method used to form roll covers is to spiral wind a semi-solid resin onto a body, followed by curing and surface finishing. Again, grooves are cut in the surface to assist dewatering in the nip. Yet another method is to cast or mold a resin-fiber system onto a mandrel or roll body, forming a composite system. Other covers may be formed of mixtures of resins (i.e., "alloys" of resins), metals and resins, ceramics, and the like.

Also in the case of conventional grooved rolls, the surface grooves are typically created by machining the roll cover surface. Again, the width and depth of the grooves and the number of grooves per inch dictate the void volume of the grooved surface. It is also noted that there are many different materials used to create grooved roll surfaces.

During the machining of grooves especially in belts, the interior walls (the sides of the lands separating the grooves) of synthetic surface material are left with microscopic surface cuts created by the action of the machine tool. These microscopic cuts can constitute crack initiation sites which may lead to larger cracks and eventual failure or delaminating of the land area on either side of the groove. In this connection, U.S. Pat. No. 5,171,389 is directed toward a method of making a grooved void-volume belt for use on a long nip press. After applying an adhesive, a strip of material having a groove already formed therein is wound about a partially completed belt and suitably attached. This, among other things, avoids having to cut grooves in the belt surface.

The present invention provides an approach towards forming grooves or other patterns on both belt and roll surfaces without machining using ribbon placement to create the grooves.

SUMMARY OF THE INVENTION

The present invention is directed towards a method of making a grooved belt or surface roll. A chemically reactive material is first placed on the surface of the partially processed belt or roll. A second material is then deposited as a ribbon on the chemically reactive surface to create a pattern of grooves. Advantageously, the placement of the ribbon is used to create the grooves therebetween and no machining is required. This eliminates the potential problem of cracking and delamination of the belt or roll surface. The resulting ribbon is smooth and uniform.

DETAILED DESCRIPTION OF THE PREFERRED EMBODIMENT

Figure 1:
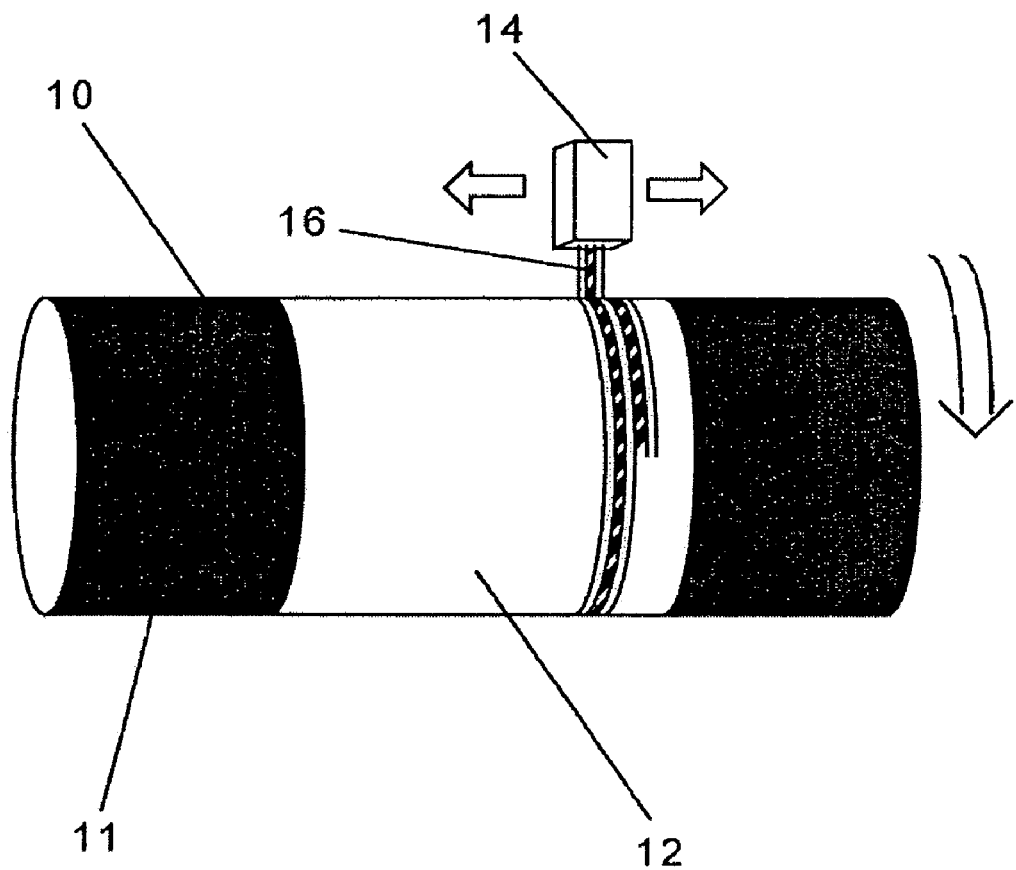
FIG. 1 illustrates the method by which the belt of the present invention may be manufactured.

A preferred embodiment of the present invention, as illustrated in FIG. 1, will now be described in the context of making a shoe press belt used in papermaking machines and the process of making it. However, it should be noted that the invention is also applicable to the manufacture of a roll or roll cover used in a papermaking machine.

Continuing to refer to FIG. 1, the belt may include a base structure or substrate which may be any conventional belt base substrate known in the art, including woven, non-woven, spiral-link, MD or CD yarn arrays, knitted fabric, extruded mesh, and spiral wound strips of woven and nonwoven materials. These substrates may comprise yarns of any of the varieties used in the production of paper machine clothing, such as monofilament, plied monofilament, multifilament and plied multifilament yarns. These yarns may be obtained by extrusion from any of the polymeric resin materials used for this purpose by those of ordinary skill in the art. Accordingly, resins from the families of polyamide, polyester, polyurethane, polyaramid, polyolefin and other resins suitable for the purpose may be used.

The present invention can be, produced by using a device similar to that shown in FIG. 1. For the present invention, the device has (A) a mandrel 11 for supporting a belt substrate 10 (or roll cover base where applicable) during production of the belt; (B) means for applying (not shown) a chemically reactive material 12 on the belt substrate 10; (C) means for depositing 14 a second material 16 onto the belt substrate 10 to form a pattern. For example, material 16 may be elastomer ribbons placed so as to form grooves therebetween; (C) means for mounting (not shown) the depositing means 14 for movement in at least one direction relative to the surface of the belt substrate 10; and (D) means to control (not shown) the movements and to control the depositing of the second material 16 from the depositing means 14.

Figure 2:
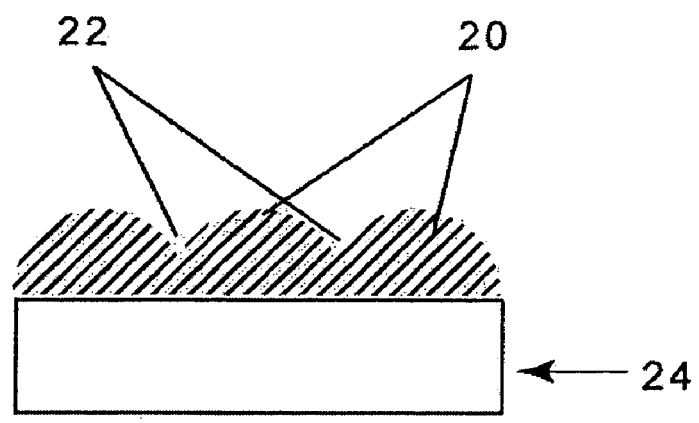
FIG. 2 illustrates using the placement of the ribbons to create the grooves.

In the example of the present invention illustrated in FIG. 1, a belt forming mandrel 11 is provided. The belt substrate 10 can and usually does have at least a partial impregnation of resin already. The inside surface (that is, the surface against the mandrel 11) also has a smooth layer of resin applied by any means known in the art. Initially, a thin film of chemically reactive elastomeric material 12 is placed on the belt substrate 10 to create a chemical bond between the substrate 10 and the second material 16 to be deposited. In this connection, the thin layer 12 must be chemically reactive for the time which is required to apply the second material 16. With the embodiment shown in FIG. 1, this second material is a liquid elastomeric ribbon stream 16. To deposit this ribbon stream 16, a chemical mixing head 14 containing the elastomeric material is so angled and controlled to traverse the width of the belt substrate 10. In this way, each revolution of the mandrel leaves a ribbon deposition of raised land areas with grooves on either side. That is, the placement of the ribbons 16 is used to create the grooves. FIG. 2 shows the distribution of the small liquid elastomer ribbons which nestle next to each other to form the lands 20 and the shaped grooves 22. Advantageously, the elastomer is engineered so that it turns from a liquid to a solid in a sufficiently short time (i.e., seconds), thus allowing the ribbon of material to retain its shape. The resulting ribbon laid surface 24 is uniform and smooth without cuts or cracks.

It should be understood that the mixing head 14 shown in FIG. 1 may have either one port or multiple ports. However, a mixing head 14 having multiple ports is preferred. In this connection, it is noted that the number of ports and dimensions thereof, and the amount of material being applied determine the size and shape of the ribbons 16. It is further noted that the greater the surface speed of the belt substrate 10, the greater the amount of material must be pumped through the ports. In this connection, controlling precisely the traverse speed of the mixing head 14 is very important, since the ribbon lay must match each previous pass. It should be further understood that the weld lines (i.e., where the respective ribbons start and end) should also match when making the ribbon pattern.

It is evident from this disclosure that a superior grooved belt or surface roll can be produced using the aforedescribed method. In this way, the direct deposition of the ribbons to produce the grooves eliminates the problems caused by the machining of grooves as practiced in the prior art. More specifically, the present invention uses the ribbons' placement to create the grooves. The resulting ribbon laid surface is uniform and smooth without cuts and cracks that lead to delamination of the belt or roll surface.

Further, by controlling the mixing head, a relatively greater amount of material (or lesser amount, as the case may be) may be applied to the desired region of the belt or roll surface in a controlled manner in a controlled geometry in three planes (x, y and z). Where applicable, this permits the formation of, for example, a crown formed as part of a roll cover, or the formation of other variations in the diameter of the surface along the cross machine direction.

Figure 3A:
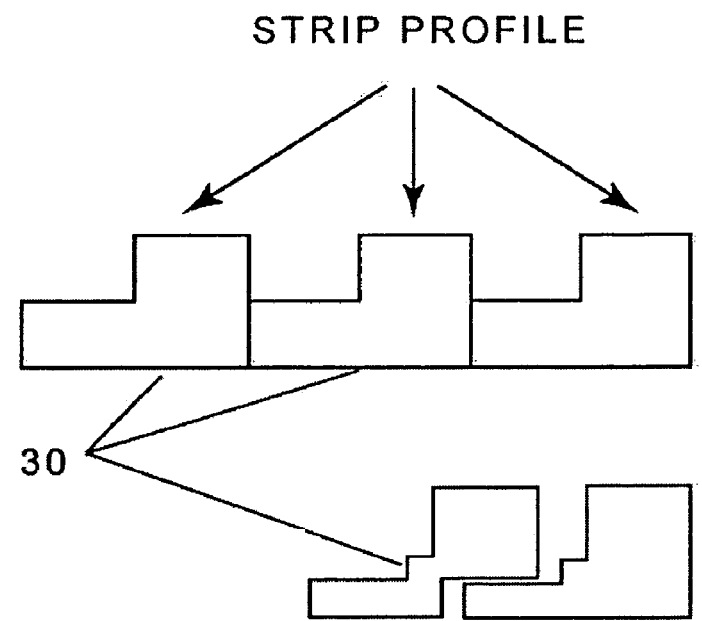
FIG. 3A illustrates the strip profile of the prior art.
Figure 3B:
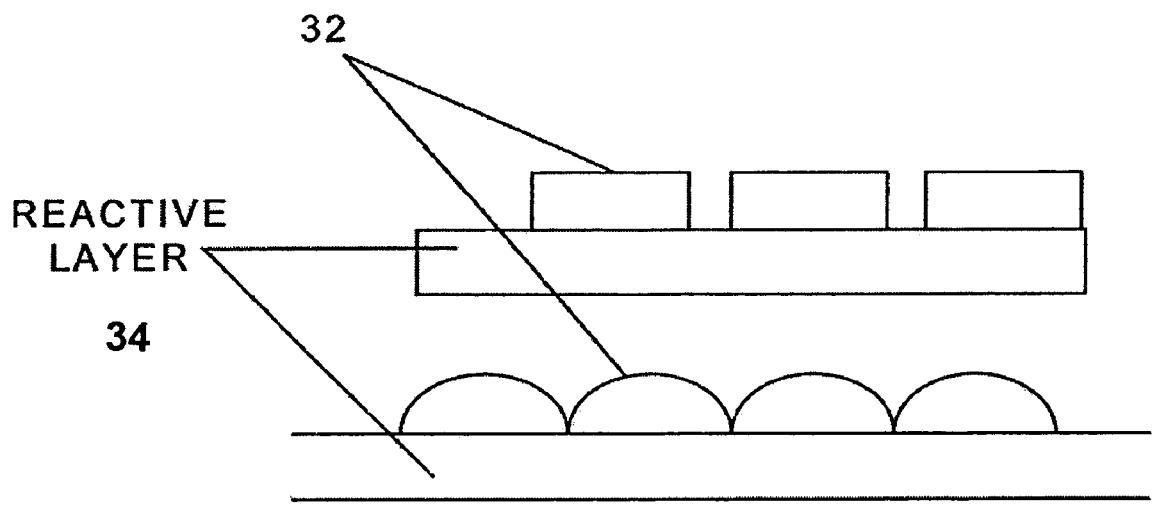
FIG. 3B illustrates exemplary profiles of the ribbons of the present invention.

It is noted that the present invention differs from the aforementioned U.S. Pat. No. 5,171,389 in that the present invention specifies first placing a chemically reactive layer 34 (see FIG. 3B) onto the belt surface prior to depositing the elastomeric ribbon stream, whereas the '389 patent instead mentions merely preapplying an adhesive. In addition, while both the '389 patent and U.S. Pat. No. 5,208,087 (Stigberg) specify strips 30 having a groove already formed therein (FIG. 3A), the present invention instead uses the ribbons' 32 placement or gelling time to create the groove (FIG. 3B). This is a major distinguishing feature. Other distinctions will be apparent to those skilled in the art.

Although preferred embodiments have been disclosed and described in detail herein, their scope should not be limited thereby rather their scope should be determined by that of the appended claims.

What is claimed is:

1. A method for manufacturing a belt for use in the production of paper and paper products, said method comprising the steps of:
   a) providing a base structure;
   b) placing a layer of a chemically reactive material over at least a portion of the base structure; and
   c) depositing an elastomeric material over the layer of the chemically reactive material which reacts and forms a bond therewith to create a pattern of grooves.

2. The method as claimed in claim 1, wherein said base structure is selected from the group consisting of woven, nonwoven, spiral-link, MD or CD yarn arrays, knitted fabric, extruded mesh, and spiral wound strips of woven and nonwoven materials comprising yarns including monofilaments, plied monofilaments, multifilaments, plied multifilaments and staple fibers.

3. The method as claimed in claim 1, wherein the chemically reactive material chemically bonds the elastomeric material to the base structure.

4. The method as claimed in claim 1, wherein the elastomeric material is deposited by a mixing head.

5. The method as claimed in claim 4, wherein the mixing head includes a plurality of ports.

6. The method as claimed in claim 4, wherein the elastomeric material is deposited by traversing the mixing head across the base structure.

7. The method as claimed in claim 1, wherein the elastomeric material is deposited on the base structure as a liquid ribbon stream.

8. The method as claimed in claim 7, wherein the ribbon stream turns from a liquid into a solid in a predetermined time period enabling the ribbon to retain its shape.

9. The method as claimed in claim 1 which further includes providing a resin coating on a side of the base structure opposite a side on which the chemically reactive material is deposited.

10. A belt for use in the production of paper and paper products, said belt comprising:
   a base structure;
   layer of a chemically reactive material on at least a portion of the base structure; and
   an elastomeric material over the layer of the chemically reactive material which reacts and forms a bond therewith to create a pattern.

11. The belt as claimed in claim 10, wherein the elastomeric material on said base structure is of a uniform thickness.

12. The belt as claimed in claim 10, wherein the elastomeric material is used to form a pattern of grooves.

13. The belt as claimed in claim 10, wherein said base structure is selected from the group consisting of woven, nonwoven, spiral-link, MD or CD yarn arrays, knitted fabric, extruded mesh, and spiral wound strips of woven and nonwoven materials comprising yarns including monofilaments, plied monofilaments, multifilaments, plied multifilaments and staple fibers.

14. The belt as claimed in claim 10, wherein the chemically reactive material chemically bonds the elastomeric material to the base structure.

15. The belt as claimed in claim 11, wherein the elastomeric material is deposited by a mixing head.

16. The belt as claimed in claim 15, wherein the mixing head includes a plurality of ports.

17. The belt as claimed in claim 15, wherein the elastomeric material is deposited by traversing the mixing head across the base structure.

18. The belt as claimed in claim 15, wherein the elastomeric material is deposited on the base structure as a liquid ribbon stream.

19. The belt as claimed in claim 18, wherein the ribbon stream turns from a liquid into a solid in a predetermined time period enabling the ribbon to retain its shape.

20. The belt as claimed in claim 18, wherein the ribbon stream is in the form of a spiral pattern.

21. The belt as claimed in claim 10 which includes a resin coating on a side of the base structure opposite a side on which the chemically reactive material is deposited.

22. A method for manufacturing a roll cover for use on a roll used in the production of paper and paper products, said method comprising the steps of:
   a) providing a base structure on which the roll cover is formed;
   b) placing a layer of a chemically reactive material over at least a portion of the base structure; and
   c) depositing an elastomeric material over the layer of the chemically reactive material which reacts and forms a bond therewith to create a pattern of grooves.

23. The method as claimed in claim 22, wherein the roll has an exterior circumferential surface and said exterior surface is the base structure upon which both materials are deposited.

24. The method as claimed in claim 22 further comprising depositing the elastomeric material on said base structure in a controlled fashion to provide a uniform thickness.

25. The method as claimed in claim 22, wherein said base structure is selected from the group consisting of woven, nonwoven, MD or CD yarn arrays, knitted fabric, extruded mesh, and spiral wound strips of woven and nonwoven materials comprising yarns including monofilaments, plied monofilaments, multifilaments, plied multifilaments and staple fibers.

26. The method as claimed in claim 22, wherein the chemically reactive material chemically bonds the elastomeric material to the base structure.

27. The method as claimed in claim 22, wherein the elastomeric material is deposited by a mixing head.

28. The method as claimed in claim 27, wherein the mixing head includes a plurality of ports.

29. The method as claimed in claim 27, wherein the elastomeric material is deposited by traversing the mixing head across the base structure.

30. The method as claimed in claim 22, wherein the elastomeric material is deposited on the base structure as a liquid ribbon stream.

31. The method as claimed in claim 30, wherein the ribbon stream turns from a liquid into a solid in a predetermined time period enabling the ribbon to retain its shape.

32. The method as claimed in claim 22 further comprising depositing said elastomeric material on said base structure in a controlled fashion to provide a non uniform thickness which is thickest in the center of the roll cover and gradually tapers going away from the center so as to create a crowned roll cover.

33. The method as claimed in claim 22 which further includes providing a resin coating on a side of the base structure opposite a side on which the chemically reactive material is deposited.

34. A roll cover for use on a roll used in the production of paper and paper products, said roll cover comprising:
   a base structure;
   layer of a chemically reactive material on at least a portion of the base structure; and
   an elastomeric material over the layer of the chemically reactive material which reacts and forms a bond therewith to create a pattern of grooves.

35. The roll cover as claimed in claim 34, wherein the elastomeric material on said base structure is of a uniform thickness.

36. The roll cover as claimed in claim 34, wherein said base structure is selected from the group consisting of woven, nonwoven, MD or CD yarn arrays, knitted fabric, extruded mesh, and spiral wound strips of woven and nonwoven materials comprising yarns including monofilaments, plied monofilaments, multifilaments, plied multifilaments and staple fibers.

37. The roll cover as claimed in claim 34, wherein the chemically reactive material chemically bonds the elastomeric material to the base structure.

38. The roll cover as claimed in claim 34, wherein the elastomeric material is deposited by a mixing head.

39. The roll cover as claimed in claim 38, wherein the mixing head includes a plurality of ports.

40. The roll cover as claimed in claim 38, wherein the elastomeric material is deposited by traversing the mixing head across the base structure.

41. The roll cover as claimed in claim 34, wherein the elastomeric material is deposited on the base structure as a liquid ribbon stream.

42. The roll cover as claimed in claim 41, wherein the ribbon stream turns from a liquid into a solid in a predetermined time period enabling the ribbon to retain its shape.

43. The roll cover as claimed in claim 34, wherein said elastomeric material on said base structure is of a non uniform thickness which is thickest in the center of the roll cover and gradually tapers going away from the center so as to create a crowned roll cover.

44. The roll cover as claimed in claim 34 which includes a resin coating on a side of the base structure opposite a side on which the chemically reactive material is deposited.

* * * * *